United States Patent
Kawauchi et al.

(10) Patent No.: US 6,859,344 B2
(45) Date of Patent: Feb. 22, 2005

(54) HEAD SLIDER WITH PREDETERMINED PHYSICAL RELATIONSHIPS

(75) Inventors: Minoru Kawauchi, Kanagawa (JP); Yoshihiro Ueno, Osaka (JP); Tatsuhiko Inagaki, Osaka (JP); Zhi Sheng Deng, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 69 days.

(21) Appl. No.: 10/261,867

(22) Filed: Oct. 1, 2002

(65) Prior Publication Data

US 2003/0072108 A1 Apr. 17, 2003

(30) Foreign Application Priority Data

Oct. 2, 2001 (JP) .......................... 2001-306122
Oct. 2, 2001 (JP) .......................... 2001-306123

(51) Int. Cl.$^7$ ................ G11B 21/21; G11B 17/32
(52) U.S. Cl. ............................................. 360/234.3
(58) Field of Search ................ 360/230–237.1

(56) References Cited

U.S. PATENT DOCUMENTS

| | | | |
|---|---|---|---|
| 4,734,803 A | | 3/1988 | Nishihira |
| 5,383,073 A | | 1/1995 | Masukawa et al. |
| 5,430,591 A | * | 7/1995 | Takeuchi et al. ......... 360/236.1 |
| 5,612,839 A | * | 3/1997 | Jacques ................... 360/246.2 |
| 5,859,748 A | * | 1/1999 | Itoh ........................ 360/246.2 |
| 6,021,024 A | | 2/2000 | Akiyama et al. |
| 6,157,519 A | * | 12/2000 | Kohira et al. ............... 360/237 |

FOREIGN PATENT DOCUMENTS

| | | | |
|---|---|---|---|
| DE | 199 29 837 A1 | 7/2000 | |
| DE | 199 42 497 A1 | 7/2000 | |
| GB | 2 272 991 A | 6/1994 | |
| JP | 03152777 A | * 6/1991 | .......... G11B/21/21 |
| JP | 03152778 A | * 6/1991 | .......... G11B/21/21 |
| JP | 08-227514 | 9/1996 | |
| JP | 2000-306226 | 11/2000 | |

OTHER PUBLICATIONS

European Search Report for EP 02 02 2109, dated May 6, 2004.

* cited by examiner

*Primary Examiner*—Craig A. Renner
(74) *Attorney, Agent, or Firm*—RatnerPrestia

(57) ABSTRACT

In a head slider, when the distance between the upstream position and the downstream position in a direction parallel to the surface of the recording medium is L, and the amount of flying in a vertical direction from the recording medium at the downstream position is Xh, and the angle formed by the surface to be opposed to the recording medium of the head slider against the recording medium in stable flying of the head slider is θp, then the relation of $$(L\ \tan\ \theta p/Xh) \leq ((Kt/Kl)-1)$$

is satisfied for membrane rigidities Kl and Kt. By such configuration of a head slider, when inertia force caused by external impact or the like is applied to the head slider, air layer formed between the air bearing surface of the head slider and the recording medium surface acts as an air spring while the head slider rotates in the pitch direction.

11 Claims, 10 Drawing Sheets

|  | Kl ×10⁻⁶(N/m) | Kt ×10⁻⁶(N/m) | Kt/Kl | G |
|---|---|---|---|---|
| Embodiment 1 | 0.79 | 2.0 | 2.53 | 1000 |
| Ex.1 | 0.62 | 0.6 | 0.97 | 260 |
| Ex.2 | 0.48 | 5.85 | 12.2 | 570 |

|  | L1 (mm) | L2 (mm) | KtL2/ KlL1 | G |
|---|---|---|---|---|
| Embodiment 2 | 0.23 | 0.58 | 2.53 | 1000 |
| Ex.3 | 0.32 | 0.3 | 0.97 | 260 |
| Ex.4 | 0.05 | 0.61 | 12.2 | 570 |

HEAD SLIDER WITH PREDETERMINED PHYSICAL RELATIONSHIPS

TECHNICAL FIELD

The present invention relates to a head slider and head supporting device and disk drive on which is mounted an information transducer for recording and reproducing of signals on and from recording medium by using the actions of magnetism, light, optical magnetism, etc.

BACKGROUND ART

Recently, the technical development is remarkable with respect to disk type recording and reproducing apparatus (hereinafter referred to as disk drive) for signal recording and reproducing on and from disk type recording medium (hereafter referred to as disk) such as magnetic disk, optical disk, and magneto-optical disk, and besides its mounting onto a computer as in conventional use, its application is also expanding, for example, to mobiles such as portable small-sized electronic equipment.

Accordingly, in recent disk drive, magnetic disk drive in particular, there is a strong demand for the development of disk drive which is capable of higher density recording, having impact resistance high enough to enable stable signal recording and reproducing without damage to the disk and head slider even when exposed to disturbance like impact, and is further miniaturized so that it can be mounted on portable small-sized electronic equipment.

As a conventional problem of impact resistance, when subjected to impact from outside such as disturbance, the head slider comes into collision or contact with the disk, causing wear or damage to the head slider or the recording layer of the disk, which may lead to the destruction of data or damage to the equipment.

In order to solve this problem, various techniques for realizing the vibration proofing of head slider have been proposed, and many of them are proposed in the form of an air bearing surface of desirable head slider.

However, such prior art is the result of examination with respect to vibration proofing property, and no examination has been made on a configuration that is capable of effectively enduring external impact.

Also, regarding a disk mounted on portable small-sized electronic equipment, the desirable clearance between the head slider and the disk, or the amount of flying, does not surpass 20 (nm). Further, taking into account the application to mobiles, the power consumed by the motor is reduced by decreasing the disk rotating speed, and thereby, the speed of the air flowing into the air bearing surface of the head slider is lowered.

Thus, in the prior art as described above, when inertia force is generated at the head slider due to the impact externally applied, it causes the head slider position to be changed, greatly increasing the possibility that the head slider comes into collision with the disk.

DISCLOSURE OF THE INVENTION

As for the head slider of the present invention, when inertial force is generated, at the upstream position spaced apart by a predetermined distance in the direction of air inflow end from the position where the inertia force is applied to the head slider, and at the downstream position spaced apart by same distance in the direction of air outflow end from the position where the inertia force is applied, the membrane rigidities of air spring layer formed between the head slider and the recording medium are Kl and Kt, respectively. And, the distance between the upstream position and the downstream position in a direction parallel to the recording medium surface is L, the amount of flying in vertical direction from the recording medium at the downstream position is Xh, and the angle formed by the surface to be opposed to the recording medium of the head slider against the recording medium in stable flying of the head slider is θp, then the relation of $$(L \tan \theta p / Xh) \leq ((Kt/Kl) - 1)$$

is satisfied.

The head supporting device of the present invention comprises a suspension having such configuration that a predetermined activating force is given to the head slider via a pivot in the direction of recording medium, and the pivot position at which the pivot touches the head slider is the rotational center of the head slider, and a head slider of the present invention.

Next, the disk drive of the present invention comprises a driving means for driving and rotating a recording medium and a disk recording medium, a rotating means for rotating a support arm, a control means, and a head supporting device with a head slider of the present invention mounted thereon.

DETAILED DESCRIPTION OF PREFERRED EMBODIMENTS (First Preferred Embodiment)

In the first preferred embodiment of the present invention is shown the configuration of a head slider of the present invention.

Figure 1:
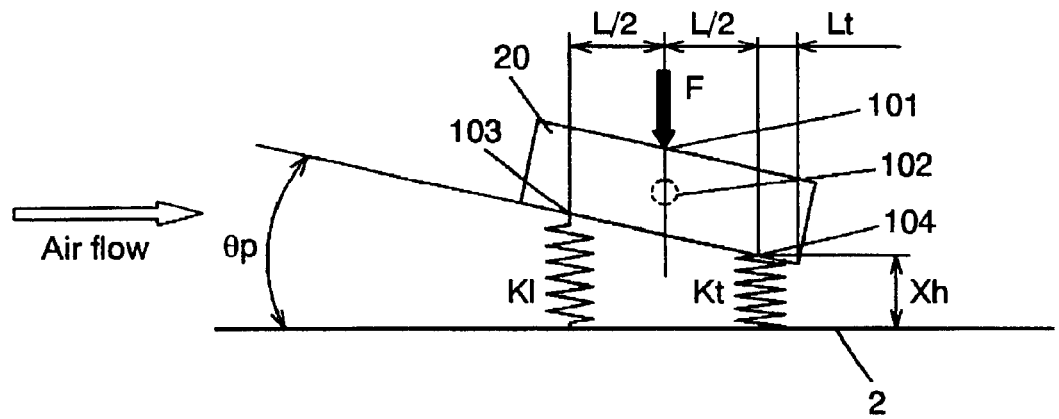
FIG. 1 is a schematic diagram showing the flying state of the head slider before inertia force caused by external impact is applied to the head slider in the first preferred embodiment of the present invention.

FIG. 1 is a head slider 20 of the present invention, which is in a stationary flying state state above a disk 2, that is, showing a stationary flying state state, keeping an angle, pitch angle θp, against the surface of the disk 2.

An activating force shown by F in the figure is given to load action point 101 from a head supporting device (not shown). Also, as the disk 2 is rotated, the air flows in between the surface opposing to the disk 2 of head slider 20 (hereafter called air bearing surface) and the surface of disk 2 in the direction of the arrow. The air layer acts as an air spring, a force that causes the head slider 20 to rise. The reaction force of the air spring is balanced with activating force F and the force due to the weight of head slider 20 that acts to move the head slider 20 closer to the disk 2, and thereby, the head slider 20 rises and keeps a stationary flying state.

Also, a point on the air bearing surface, moved by distance L/2 in parallel with the surface of disk 2 in the direction of air inflow end (left-hand side of the drawing) from the point at which a perpendicular drawn from the load action point 101, where the activating force F is given to the head slider 20, down to the surface of disk 2 intersects the air bearing surface, is upstream rigidity action position 103, while a point on the air bearing surface, moved by distance L/2 in parallel with the surface of disk 2 in the direction of air outflow end (right-hand side of the drawing) is downstream rigidity action position 104.

Here, the rigidity of the air spring is supposed to be a rigid spring, and the stiffness at the upstream rigidity action position 103 being Kl and the stiffness at the downstream rigidity action position 104 being Kt, it is supposed that the head slider 20 is kept in a stationary flying state by two rigid springs at the two points.

The stiffness can be freely changed in accordance with the change in design of the shape of the air bearing surface of the head slider 20.

Also, the distance between the downstream rigidity action position 104 and the surface of disk 2 is Xh, and the distance parallel to the surface of disk 2 between the downstream rigidity action position 104 and the point closest to the air outflow end (right-hand side of the drawing) on the air bearing surface of the head slider 20 is Lt.

Also, in order to lessen the influence of inertia force due to turbulence such as external impact and to improve the impact resistance, it is configured so that center of gravity 102 and load action point 101 of head slider 20 coincide with each other when projected in the direction of disk 2.

Under the condition, the head slider 20 of the present invention satisfies the relation of $$(L \tan \theta p / Xh) \leq ((Kt/Kl) - 1) < (L/Lt) \tag{1}$$

It has been found that the head slider 20 is strongest against impact caused by turbulence, and excellent in impact resistance when the formula (1) is satisfied.

With respect to the head slider 20 of the present invention that satisfies the formula (1), the behavior of same subjected to impact caused by turbulence is described with reference to FIG. 2.

Figure 2:
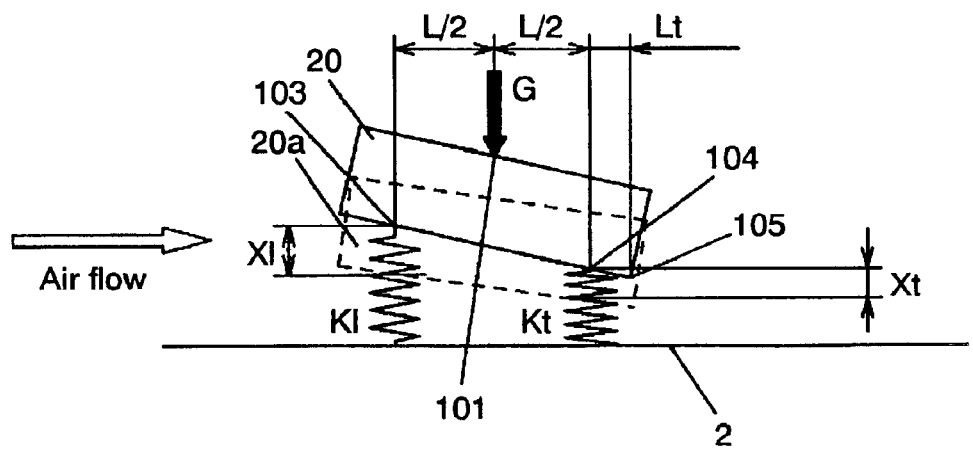
FIG. 2 is a schematic diagram showing the behavior in the flying state of the head slider when inertia force caused by external impact is applied to the head slider in the first preferred embodiment of the present invention.

In FIG. 2, the head slider 20 shown by solid line shows the position before application of inertia force G caused due to impact or the like, and head slider 20a shown by broken line shows the position when inertia force G is externally applied thereto. The inertia force G acts on load action point 101 at which activating force F is given to the head slider 20, and also, the vertical displacement of upstream rigidity action position 103 is Xl and the vertical displacement of downstream rigidity action position 104 is Xt, respectively when the inertia force G acts on the load action point 101.

In this case, when the head slider 20 of the present invention, subjected to impact, absorbs the inertia force G with the spring rigidity of air lubricating film, the amount of its displacement to approach the surface of disk 2 is greater at the air inflow end (left-hand side of the drawing) than at the air outflow end (right-hand side of the drawing).

That is, it is configured that the head slider 20 absorbs the inertia force G with the rigidity of air spring while rotating in the pitch direction. By employing such configuration, it is possible to obtain head slider 20 which ensures excellent impact resistance.

Next, the conditions to be satisfied for realizing such head slider 20 will be described in detail.

In a stationary state shown in FIG. 1, the head slider 20 is flying at pitch angle θp while keeping a space equivalent to the amount of flying Xh at the downstream rigidity action position 104. At the time, the difference in flying height between the upstream rigidity action position 103 and the downstream rigidity action position 104 can be represented by L tan θp, and the ratio a to the amount of flying Xh can be represented by the following formula (2).

$$a = (L \tan \theta p / Xh) \tag{2}$$

Also, in the behavior of the head slider 20 when inertia force G caused by external impact is applied, shown in FIG. 2, the difference in displacement vertical to the surface of disk 2 between the upstream rigidity action position 103 and the downstream rigidity action position 104, and ratio b to Xt can be represented by the following formula.

$$b = ((Xl - Xt)/Xt) = (Xl/Xt) - 1 \tag{3}$$

In this case, as the condition for realizing high impact resistance, when inertia force caused by impact is applied to the head slider 20, the head slider 20 should rotate in the pitch direction while the inertia force is absorbed by the air spring between the air bearing surface and the surface of disk 2, that is, the ratio b of displacement amounts is equal to or larger than the ratio a of flying heights in the initial stationary flying position, that is, the relation of a≦b should be true, and the relationship shown by the formula (4) should hold good.

$$(L \tan \theta p/Xh) \leq ((Xl/Xt)-1) \quad (4)$$

That is, a head slider that satisfies the formula (4) is strong against inertia force caused by external impact.

Figure 3:
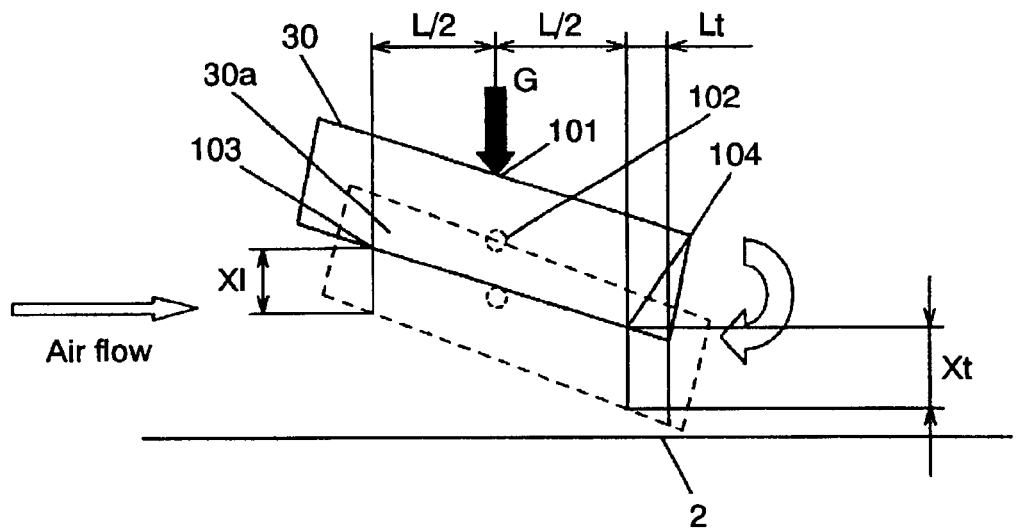
FIG. 3 is a schematic diagram showing the behavior in the flying state of the head slider when inertia force is applied to the head slider of the comparative example 1 as against the present invention.

In contrast, when the formula (4) is not satisfied, that is, head slider 30 having the relation of a>b, the behavior is as shown in FIG. 3. The displacement with inertia force G applied is shown by head slider 30a.

When the relation is a>b, it means that the air outflow end of head slider 30 initially being closer to the disk 2, subjected to external impact, is given priority to approach the surface of disk 2 and is liable to contact therewith, and therefore, it can be said that the head slider involves a problem of impact resistance.

Figure 4:
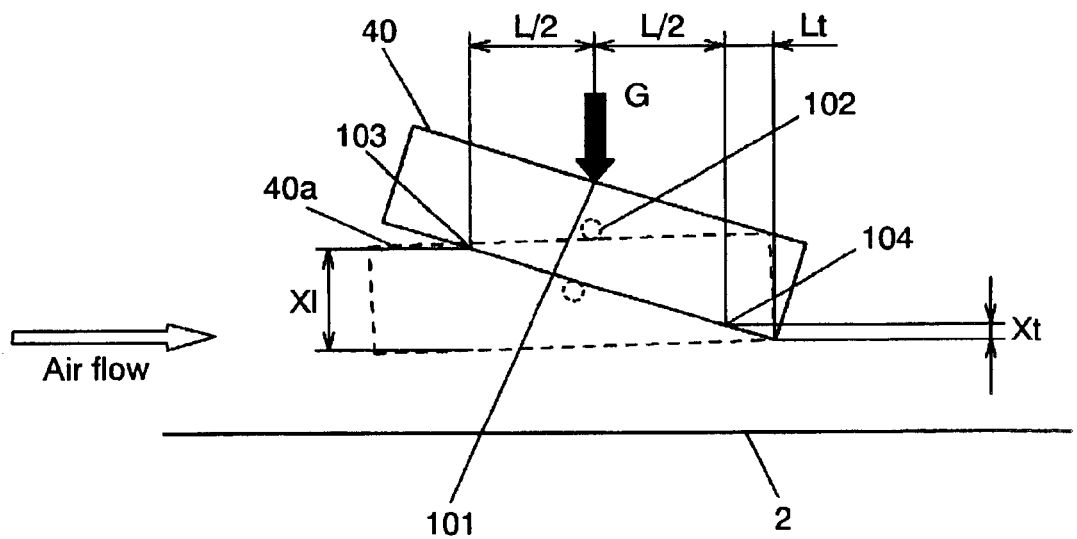
FIG. 4 is a schematic diagram showing the behavior in the flying state of the head slider when inertia force is applied to the head slider of the comparative example 2 as against the present invention.

However, even in the case of a head slider that satisfies the relation of a≦b, when the inertia force is absorbed by the air spring, if external impact is applied in the pitch direction as in head slider 40 shown in FIG. 4, it will be displaced to the position shown by head slider 40a. And in case the air outflow end excessively approaches the disk surface, no air lubricating film will be formed between the head slider 40a and the disk 2, while the head slider 40a loses its flying power and collides with the surface of disk 2. The condition for avoiding such collision will be described in the following.

Back in FIG. 1, between the downstream rigidity action position 104 and the air outflow end portion 105 on the air bearing surface, when the distance in a direction parallel to the disk 2 is Lt, then the ratio c of L and Lt can be represented by the following formula.

$$c=L/Lt \quad (5)$$

Such a phenomenon that no air lubricating film is formed due to excessive rotation of the head slider in the pitch direction as described above takes place because, when inertia force G caused by impact is applied to the head slider, the ratio b of displacement amounts represented by formula (3) is larger than the ratio c of lengths in a direction parallel to the disk 2 of the head slider represented by formula (5), and the displacement at the air upstream side determined by the ratio of inertia force G due to impact and air lubricating film rigidity is relatively smaller as against the length in a direction parallel to the disk 2 of the head slider.

Further, the impact resistance value of the head slider, with which the flying space at the upstream rigidity action position 103 becomes smaller than that at the downstream rigidity action position 104, is closely related with the variation of rotating speed and skew angle or the change of load or the like as well as the opposite-to-medium surface (the air bearing surface) shape, and also, as the flying space becomes smaller, it will rapidly lead to damage, causing greater variation of the impact resistance value, and it can be said that the head slider involves a problem of impact resistance.

Contrarily, as in the head slider 20 of the present embodiment, in case the ratio b of displacement amounts represented by formula (3) is smaller than the ratio c of lengths parallel to the disk 2 of the head slider represented by formula (5), that is, when the relation of b<c is satisfied or the formula (6)

$$((Xl/Xt)-1)<(L/Lt) \quad (6)$$

is satisfied, the head slider 20 is very strong against inertia force caused by external impact.

Accordingly, it can be said that the head slider of the present invention, having excellent impact resistance, is a head slider that satisfies the formula (4) and formula (6), that is, a head slider that satisfies formula (7)

$$(L \tan \theta p/Xh) \leq ((Xl/Xt)-1)<(L/Lt) \quad (7)$$

which is most excellent in impact resistance.

Here, when the membrane rigidities at the upstream rigidity action position 103 and the downstream rigidity action position 104 are Kl and Kt respectively, as described above, since inertia force G is applied to the load action point 101, the components of force become equal to each other with respect to the inertia force G generated at the upstream rigidity action position 103 and the downstream rigidity action position 104 when inertial force G caused by external impact is applied to the head slider. Therefore, the amount of displacement in a direction vertical to the disk 2 at the upstream rigidity action position 103 and the downstream rigidity action position 104 of the head slider can be represented by $$Kl \times Xl = Kt \times Xt$$

that is, $$(Xl/Xt)=(Kt/Kl) \quad (8)$$

from the relation of F=kx (F: force given, k: stiffness (elastic stiffness), x: displacement) that is a common formula for presenting the relations of elastic stiffness, inertia force and displacement. Accordingly, the formula (4) and formula (6) are same as the following formula (9) and formula (10) respectively.

$$L \tan \theta p/Xh \leq ((Kt/Kl)-1) \quad (9)$$

$$((Kt/Kl)-1)<(L/Lt) \quad (10)$$

Both of the formula (9) and formula (10) are satisfied when $$L \tan \theta p/Xh \leq ((Kt/Kl)-1)<(L/Lt) \quad (1)$$

is just satisfied.

Specifically, it is possible to obtain a head slider having excellent impact resistance by designing an air bearing surface shape capable of realizing Kt and Kl that satisfy the formula (1).

A head supporting device and disk drive having excellent impact resistance and being strong against external impact may be realized by mounting a head slider having an opposite-to-medium surface shape that satisfies the formula (4) and (6) or the formula (9) and formula (10) [that is, formula (7) or (1)].

In a disk drive, it can be considered that the relative speed between the head slider and the disk is generally lower when the head slider is positioned at the inner periphery of the disk than at the outer periphery thereof, causing the air flow generated at the air bearing surface and the amount of flying to become less and the impact resistance to be lowered.

Accordingly, it is just enough to satisfy the above formula (4) and formula (6) or the formula (9) and formula (10) at least when the amount of flying is least at the inner periphery of the disk.

Also, in the present preferred embodiment, an example of producing necessary membrane rigidity by using a positive pressure generated in the air flow between the air bearing surface and the disk is shown, but it goes without saying that similar effect can be obtained by realizing a configuration that may bring about similar membrane rigidity by using other lubricating agent.

Next, in order to verify the condition for a head slider having excellent impact resistance as described above, the difference in impact resistance due to the difference in air bearing surface shape of the head slider was specifically examined, and the results are shown in the following.

Figure 5:
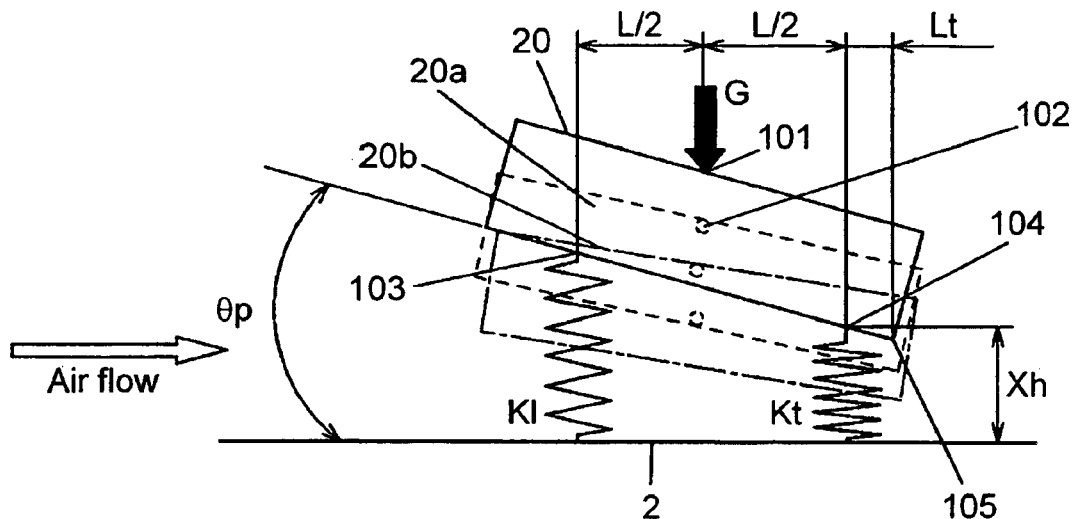
FIG. 5 is a schematic diagram showing the behavior in the flying state of the head slider when inertia force caused by external impact is applied to the head slider in the first preferred embodiment of the present invention.
Figure 6:
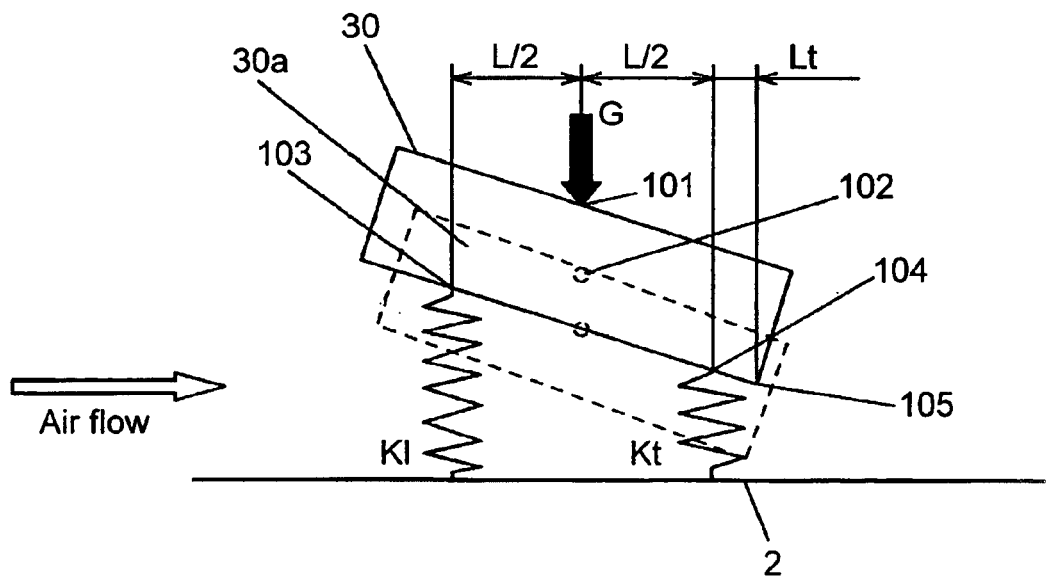
FIG. 6 is a schematic diagram showing the behavior in the flying state of the head slider when inertia force caused by external impact is applied to the head slider of the comparative example 1 as against the present invention.
Figures 7, 8:
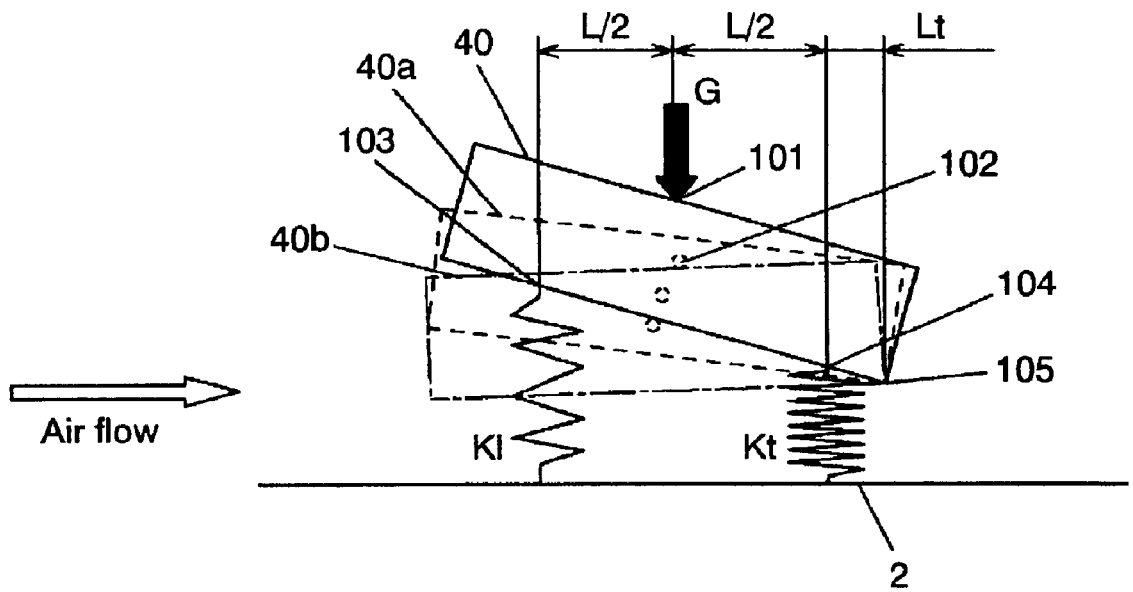
FIG. 7 is a schematic diagram showing the behavior in the flying state of the head slider when inertia force caused by external impact is applied to the head slider of the comparative example 2 as against the present invention.
FIG. 8 is a characteristics table of comparison between the head slider in the first preferred embodiment of the present invention and the comparative example.

In FIG. 8 are shown the specification of the head slider subjected to the evaluation, and the evaluation result of impact resistance. Also, the behaviors of the head slider when inertia force is applied to each head slider are shown in FIG. 5, FIG. 6 and FIG. 7.

In the head slider of the present invention, when the air lubricating film rigidities obtained at the upstream rigidity action position 103 and the downstream rigidity action position 104, located at an equal distance of L/2 in a direction parallel to the disk 2 from the inertia force action position when inertia force G caused by external impact or the like is applied, are respectively Kl and Kt, then Kl=0.79× $10^{-6}$ (N/m) and Kt=2.0×$10^{-6}$ (N/m) when L=1.0 (mm). Further, the evaluation was executed under the condition: the distance Lt=0.1 (mm) between the downstream rigidity action position 104 and the air outflow end portion 105; the amount of flying Xh=20 (nm) at the downstream rigidity action position 104 in a stationary flying state at the inner periphery of the disk; and the pitch angle θp=30 ($\mu$rad).

On the other hand, for the purpose of comparison with the head slider of the present invention, the evaluation was also executed with respect to the head sliders based on the specifications of the comparative example 1 and comparative example 2 shown in FIG. 8.

In the air bearing surface of head slider 30 of comparative example 1, when the air lubricating film rigidities at the upstream rigidity action position 103 and the downstream rigidity action position 104 are respectively Kl and Kt, then Kl=0.62×$10^{-6}$ (N/m), Kt=0.6×$10^{-6}$ (N/m).

Also, in head slider 40 of comparative example 2, when the air lubricating film rigidities at the upstream rigidity action position 103 and the downstream rigidity action position 104 are respectively Kl and Kt, then Kl=0.48×$10^{-6}$ (N/m), Kt=5.85×$10^{-6}$ (N/m).

As for the head slider 20 in the preferred embodiment of the present invention, and the head sliders 30, 40 of the comparative example 1 and comparative example 2, the ratio of air lubricating film rigidities (Kt/Kl) at the upstream rigidity action position 103 and the downstream rigidity action position 104 were obtained, and at the same time, the impact resistance (G in the figure) when inertia force is generated due to external impact such as causing the head slider to approach the disk was evaluated, and the results are shown in FIG. 8. Here, the impact resistance is represented by the level of inertia force necessary for making any part of the head slider subjected to the evaluation come into contact with the disk.

In the evaluation of such impact resistance, the conditions for evaluation are as follows: the equivalent mass including the head slider and slider supporting section is 8 (mg); the activating force given from the suspension to the head slider is 2 (gf); the disk rotating speed is 4,500 (rpm); and the skew angle is −5(°) at the position of disk radius 6 (mm).

As shown in FIG. 8, the air lubricating film rigidity ratio of the head slider 20 in the present embodiment is 2.53, while the air lubricating film rigidity ratios of comparative examples 1 and 2 are respectively 0.97 and 12.2. Also, the impact resistance value of the head slider 20 in the preferred embodiment is 1000 G, while the impact resistance values of comparative examples 1 and 2 are respectively 260 G and 570 G.

Taking into account the use as a magnetic disk drive in use for mobiles, it is obvious that the head slider of the present invention may realize practical impact resistance.

Figure 9:
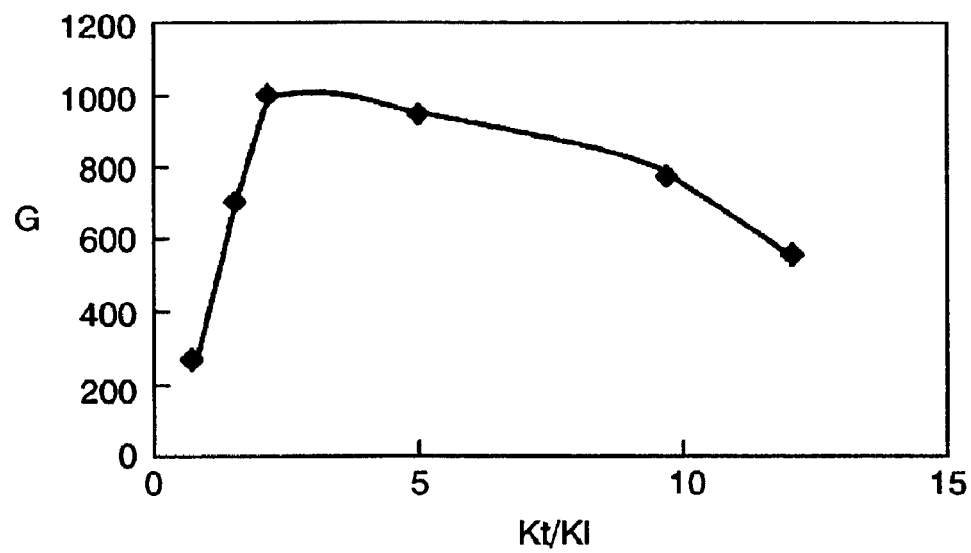
FIG. 9 is a chart showing the relationship between Kt/Kl value and impact resistance value in the first preferred embodiment of the present invention.

Next, as for several head sliders including the head slider 20 of the present embodiment and the head sliders 30, 40 of comparative examples 1, 2, the relations of the air lubricating film rigidity ratio (Kt/Kl) at the upstream rigidity action position 103 and the downstream rigidity action position 104, and the evaluation results of impact resistance are graphed in FIG. 9.

As is apparent in FIG. 9, the variation of impact resistance is depending upon the value of air lubricating film rigidity ratio (Kt/Kl) between the upstream rigidity action position 103 and the downstream rigidity action position 104.

As described above, in case the air lubricating film rigidity at the upstream rigidity action position 103 is different from the air lubricating film rigidity action position 104, the head slider subjected to the inertia force G caused by external impact is different in the amount of displacement in a direction vertical to the disk between the upstream rigidity action position 103 and the downstream rigidity action position 104, and therefore, it is displaced while rotating in the pitch direction.

That is, the behavior of the head slider when inertia force G caused by external impact is applied thereto varies with the air lubricating film rigidity ratio (Kt/Kl) between the downstream rigidity action position and the upstream rigidity action position.

When the condition for the present evaluation is inserted into the design condition of the head slider having excellent impact resistance in the present invention described above, that is, $$(L \tan \theta p/Xh) \leq ((Kt/Kl)-1) < (L/Lt) \tag{1}$$

then obtained is $$1.5 \leq ((Kt/Kl)-1) < 10.0 \tag{12}$$

and when $$2.5 \leq (Kt/Kl) < 11.0 \tag{13}$$

is satisfied, it is possible to obtain a head slider having excellent impact resistance.

Next, regarding three types of head sliders in the present preferred embodiment, the behaviors when inertia force is applied thereto will be described with reference to the drawings.

The head slider 20 of the present invention satisfies the condition of formula (13). Therefore, as shown in FIG. 5, when inertia force G caused by external impact is applied to the head slider 20, it is displaced to the position shown by head slider 20a, but the displacement amount of flying space is smaller at the outflow end side than at the inflow end side. When inertia force larger than inertia force G is further generated due to external impact, it is displaced to the position shown by head slider 20b. However, even in this condition, since the head slider maintains a positive pitch angle, the air lubricating film formed between the air bearing surface of head slider 20 and the surface of disk 2 will not be broken, and thereby, the air lubricating film acting as an air spring may prevent the surfaces from colliding with each other. Or, even in case of colliding, the colliding energy is very low and it will hardly cause damage to the head slider 20 or disk 2.

On the other hand, in the case of head slider 30 of the comparative example 1, as shown in FIG. 6, the air lubricating film rigidity ratio is 0.97 and does not satisfy the condition of formula (13). At the upstream rigidity action position 103, the amount of displacement in a direction vertical to the disk 2 after application of inertia force G caused by external impact is smaller as against the amount of flying in the initial position. Therefore, when inertia force G is generated due to external impact, the head slider is hardly rotated in the pitch direction and is displaced nearly vertically. As a result, a relatively low inertia force G due to external impact may cause the air outflow end portion 105 at the downstream side to come into collision with the disk 2.

Also, in the case of head slider 40 of the comparative example 2, as shown in FIG. 7, the air lubricating film rigidity ratio is 12.2 and does not satisfy the condition of formula (13). In such head slider 40, even when displaced to the position shown by head slider 40a due to inertia force G caused by external impact, it will not collide with the disk 2. However, when inertia force is further generated due to external impact, as shown by head slider 40b, the flying space at the air inflow end of the upstream side is smaller than the flying space at the air outflow end of the downstream side, then no air lubricating film is formed between the air bearing surface of head slider 40 and the surface of disk 2. Such a phenomenon results in abrupt losing of the flying power, causing the head slider 40 to collide with the surface of disk 2, and it will increase the possibility of damaging the head slider 40 or disk 2.

Through the above examination, it has been verified that the head slider of the present invention is excellent in impact resistance, satisfying the condition mentioned above.

In the head slider of the present invention, the air bearing surface shape is not limited by any means. Whatever the shape of the air bearing surface, it is possible to obtain a head slider having excellent impact resistance provided that the relation of air lubricating film rigidity ratio is as shown in the formula (1).

(Second Preferred Embodiment)

In the second preferred embodiment of the present invention is shown the configuration of a head slider of the present invention.

Figure 10:
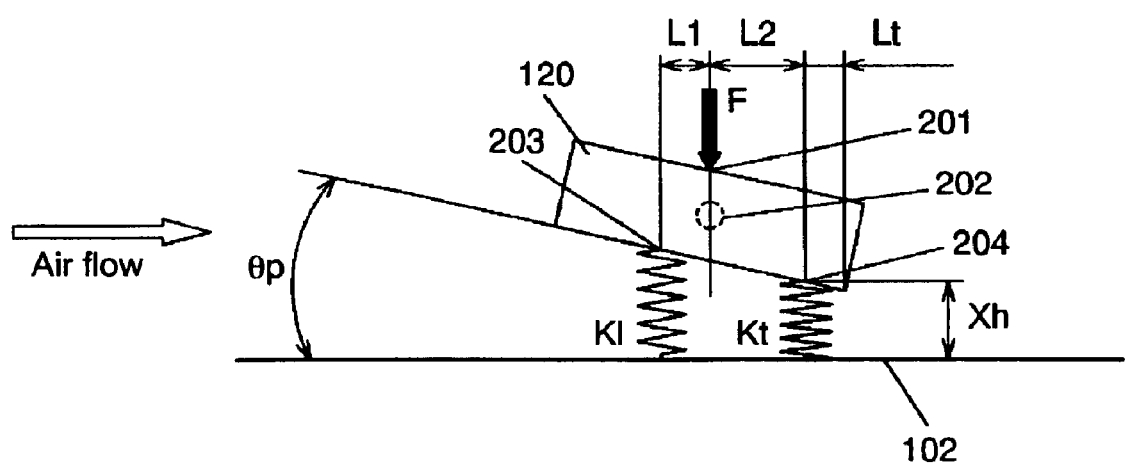
FIG. 10 is a schematic diagram showing the flying state of the head slider before inertia force caused by external impact is applied to the head slider in the second preferred embodiment of the present invention.

FIG. 10 is a head slider 120 of the present invention, which is in a stationary flying state above a disk 102, that is, showing a stationary flying state, keeping an angle, pitch angle θp, against the surface of the disk 102.

An activating force shown by F in the figure is given to load action point 201 from a head supporting device (not shown). Also, as the disk 102 is rotated, the air flows in between the surface opposing to the disk 102 of head slider 120 (hereafter called air bearing surface) and the surface of disk 102 in the direction of the arrow. The air layer acts as an air spring, a force that causes the head slider 120 to rise. The reaction force of the air spring is balanced with activating force F and the force due to the weight of head slider 120 that acts to move the head slider 120 closer to the disk 102, and thereby, the head slider 120 rises and keeps a stationary flying state.

Also, a point on the air bearing surface, moved by distance L1 in parallel with the surface of disk 102 in the direction of air inflow end (left-hand side of the drawing) from the point at which a perpendicular drawn from the load action point 201, where the activating force F is given to the head slider 120, down to the surface of disk 102 intersects the air bearing surface, is upstream rigidity action position 203, while a point on the air bearing surface, moved by distance L2 in parallel with the surface of disk 102 in the direction of air outflow end (right-hand side of the drawing) is downstream rigidity action position 204.

Here, the rigidity of the air spring is supposed to be a rigid spring, and the stiffness at the upstream rigidity action position 203 being Kl and the stiffness at the downstream rigidity action position 204 being Kt, it is supposed that the head slider 120 is kept in a stationary flying state by two rigid springs at each of the two positions.

The stiffness can be freely changed in accordance with the change in design of the shape of the air bearing surface of the head slider 120.

Also, the distance between the downstream rigidity action position 204 and the surface of disk 102 is Xh, and the distance parallel to the surface of disk 102 between the downstream rigidity action position 204 and the point closest to the air outflow end (right-hand side of the drawing) on the air bearing surface of the head slider 120 is Lt.

Also, in order to lessen the influence of inertia force due to turbulence such as external impact and to improve the impact resistance, it is configured so that center of gravity 202 and load action point 201 of head slider 120 coincide with each other when projected in the direction of disk 102.

Under the condition, the head slider 120 of the present invention satisfies the relation as follows:

$$((L1+L2)\tan \theta p/Xh) \leq ((KtL2/KlL1)-1) < ((L1+L2)/Lt) \quad (14)$$

It has been found that the head slider 120 is strongest against impact caused by turbulence, and excellent in impact resistance when the formula (14) is satisfied.

With respect to the head slider 120 of the present invention that satisfies the formula (14), the behavior of same subjected to impact caused by turbulence is described with reference to FIG. 11.

Figure 11:
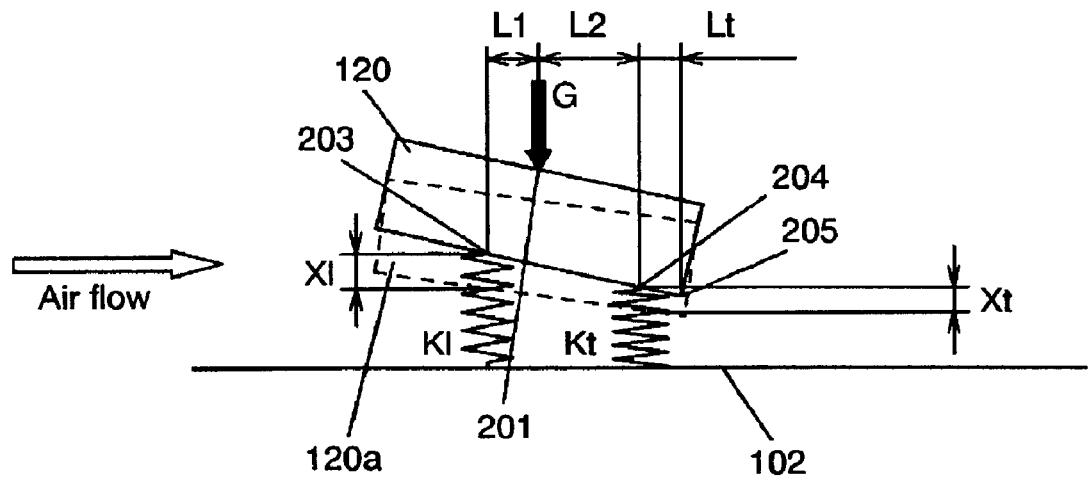
FIG. 11 is a schematic diagram showing the behavior in the flying state of the head slider when inertia force caused by external impact is applied to the head slider in the second preferred embodiment of the present invention.

In FIG. 11, the head slider 120 shown by solid line shows the position before application of inertia force G caused due to impact or the like, and head slider 120a shown by broken line shows the position when inertia force G is externally applied thereto. The inertia force G acts on load action point 201 at which activating force F is given to the head slider 120, and also, the vertical displacement of upstream rigidity action position 203 is Xl and the vertical displacement of downstream rigidity action position 204 is Xt, respectively when the inertia force G acts on the load action point 201.

In that case, when the head slider 120 of the present invention, subjected to impact, absorbs the inertia force G with the spring rigidity of air lubricating film, the amount of its displacement to approach the surface of disk 102 is greater at the air inflow end (left-hand side of the drawing) than at the air outflow end (right-hand side of the drawing).

That is, it is configured that the head slider 120 absorbs the inertia force G with the rigidity of air spring while rotating in the pitch direction. By employing such configuration, it is possible to obtain head slider 120 which ensures excellent impact resistance.

Next, the conditions to be satisfied for realizing such head slider 120 will be described in detail.

In a stationary state shown in FIG. 10, the head slider 120 is flying at pitch angle θp while keeping a space equivalent to the amount of flying Xh at the downstream rigidity action position 204. At the time, the difference in flying height between the upstream rigidity action position 203 and the downstream rigidity action position 204 can be represented by ((L1+L2)tan θp), and the ratio a to the amount of flying Xh can be represented by the following formula.

$$a = ((L1+L2)\tan \theta p/Xh) \quad (15)$$

Also, in the behavior of the head slider 120 when the inertia force G caused by external impact is applied thereto, shown in FIG. 11, the difference in displacement in a direction vertical to the disk 102 between the upstream rigidity action position 203 and the downstream rigidity action position 204, and ratio b to Xt can be represented by the following formula.

$$b = ((Xl-Xt)/Xt) = (Xl/Xt)-1 \quad (16)$$

In this case, as the condition for realizing high impact resistance, when the head slider 120 is subjected to inertia force due to impact, the head slider 120 should rotate in the pitch direction while the inertia force is absorbed by the air spring between the air bearing surface and the surface of disk 102, that is, the ratio b of displacement amounts is equal to or larger than the ratio a of flying heights in initial stationary flying position, that is, the relation of a≦b should be true, and the relationship shown by the formula (17) should hold good.

$$((L1+L2)\tan \theta p/Xh) \leq ((Xl/Xt)-1) \quad (17)$$

That is, a head slider that satisfies the formula (17) is strong against inertia force caused by external impact.

Figure 12:
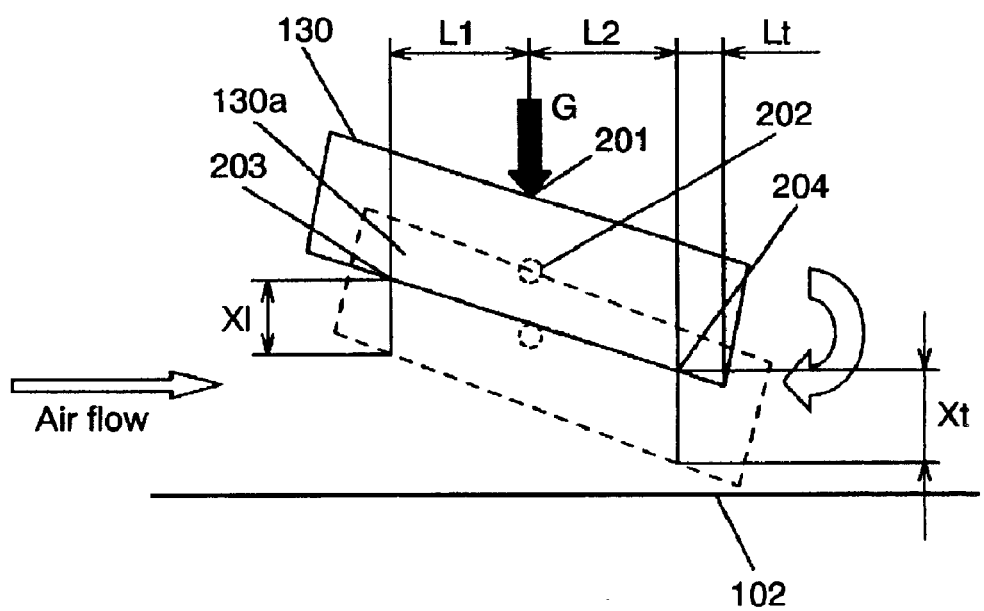
FIG. 12 is a schematic diagram showing the behavior in the flying state of the head slider when inertia force is applied to the head slider of the comparative example 3 as against the present invention.

In contrast, when the formula (17) is not satisfied, that is, head slider 130 having the relation of a>b, the behavior is as shown in FIG. 12. The displacement with inertia force G applied is shown by head slider 130a.

When the relation is a>b, it means that the air outflow end of head slider 130 initially being closer to the disk 102, subjected to external impact, is given priority to approach the surface of disk 102 and is liable to contact therewith, and therefore, it can be said that the head slider involves a problem of impact resistance.

Figure 13:
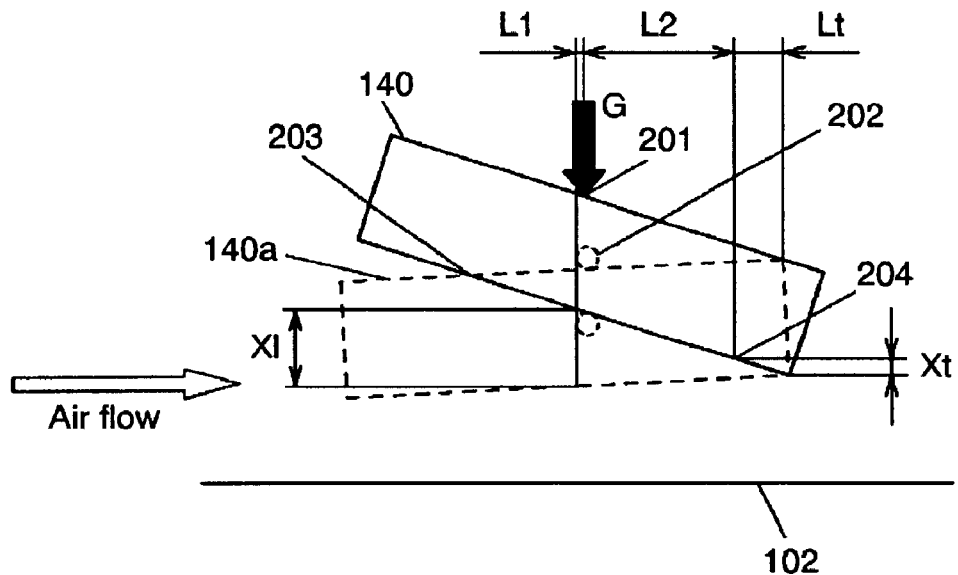
FIG. 13 is a schematic diagram showing the behavior in the flying state of the head slider when inertia force is applied to the head slider of the comparative example 4 as against the present invention.

However, even in case of a head slider that satisfies the relation of a≦b, when the inertia force is absorbed by the air spring, if external impact is applied in the pitch direction as in head slider 140 shown in FIG. 13, it will be displaced to the position shown by head slider 140a. And in case the air outflow end excessively approaches the disk surface, no air lubricating film will be formed between the head slider 140a and the disk 102, while the head slider 140a loses its flying power and collides with the surface of disk 102. The conditions for avoiding such collision will be described in the following.

Back in FIG. 10, between the downstream rigidity action position 204 and the air outflow end portion 205 of the air bearing surface, when the distance in a direction parallel to the disk 102 is Lt, then the ratio c of (L1+L2) and Lt can be represented by the following formula.

$$c=(L1+L2)/Lt \quad (18)$$

Such a phenomenon that no air lubricating film is formed due to excessive rotation of the head slider in the pitch direction as described above takes place because, when inertia force G caused by impact is applied to the head slider, the ratio b of displacement amounts represented by formula (16) is larger than the ratio c of lengths in a direction parallel to the disk 102 of the head slider represented by formula (18), and the displacement at the air upstream side determined by inertia force G caused by external impact and air lubricating film rigidity ratio is relatively smaller as against the length in a direction parallel to the disk 102 of the head slider.

Further, the impact resistance value of the head slider, with which the flying space at the upstream rigidity action position 203 becomes smaller than that at the downstream rigidity action position 204, is closely related with the variation of rotating speed and skew angle or the change of load or the like as well as the opposite-to-medium surface shape (the air bearing surface), and also, as the flying space becomes smaller, it will rapidly lead to damage, causing greater variation of the impact resistance value, and it can be said that the head slider involves a problem of impact resistance.

Contrarily, as in the head slider 120 of the present embodiment, in case the ratio b of displacement amounts represented by formula (16) is smaller than the ratio c of lengths in a direction parallel to the disk 102 of the head slider represented by formula (18), that is, when the relation of b<c is satisfied or the formula (19)

$$((Xl/Xt)-1)<((L1+L2)/Lt) \quad (19)$$

is satisfied, the head slider 120 is very strong against inertia force caused by external impact.

Accordingly, it can be said that the head slider of the present invention, having excellent impact resistance, is a head slider that satisfies the formula (17) and formula (19), that is, a head slider that satisfies formula (20)

$$((L1+L2)\tan \theta p/Xh) \leq ((Xl/Xt)-1)<((L1+L2)/Lt) \quad (20)$$

which is most excellent in impact resistance.

Here, when the membrane rigidities at the upstream rigidity action position 203 and the downstream rigidity action position 204 are respectively Kl and Kt, as described above, since inertia force G is applied to the load action point 201, when inertia force G caused by external impact is applied to the head slider, the components of force of inertia force G generated at the upstream rigidity action position 203 and the downstream rigidity action position 204 are respectively F1 and F2, then from a common formula for representing the relations of elastic stiffness, inertia force and displacement, F=kx (F: given force, k: stiffness (elastic stiffness), x: displacement), $$F1=Kl \times Xl \quad (21)$$

$$F2=Kt \times Xt \quad (22)$$

can be obtained and changed as follows:

$$Xl=F1/Kl \quad (23)$$

$$Xt=F2/K2 \quad (24)$$

and then, the ratio of Xl and Xt is $$(Xl/Xt)=(F1 \times Kt)/(Kl \times F2) \quad (25)$$

Also, $$F1 \times L1 = F2 \times L2 \quad (26)$$

can be obtained, and then $$F2=(F1 \times L1/L2) \quad (27)$$

It is put into formula (25) to obtain $$(Xl/Xt)=((Kt \times L2)/(K1 \times L1)) \quad (28)$$

Therefore, the formula (17) and formula (19) are same as the following formula (29) and formula (30) respectively.

$$((L1+L2)\tan \theta p)/Xh \leq ((KtL2/KlL1)-1) \quad (29)$$

$$((Kt+L2/KlL1)-1)<((L1+L2)/Lt) \quad (30)$$

Both of the formula (22) and formula (23) are satisfied when $$((L1+L2)\tan \theta p)/Xh \leq ((KtL2/KlL1)-1)<((L1+L2)/Lt) \quad (14)$$

is satisfied.

Specifically, it is possible to obtain a head slider having excellent impact resistance by designing an air bearing surface shape capable of realizing Kt and Kl that satisfy the formula (14).

A head supporting device and disk drive having excellent impact resistance and being strong against external impact may be realized by mounting a head slider having an opposite-to-medium surface shape that satisfies the formula (17) and (19) or the formula (29) and formula (30) [that is, formula (20) or (14)].

In a disk drive, it can be considered that the relative speed between the head slider and the disk is generally lower when the head slider is positioned at the inner periphery of the disk than at the outer periphery thereof, causing the air flow generated at the air bearing surface and the amount of flying to become less and the impact resistance to be lowered.

Accordingly, it is just enough to satisfy the above formula (17) and formula (19) or the formula (29) and formula (30) at least when the amount of flying is least at the inner periphery of the disk.

Also, in the present preferred embodiment, an example of producing necessary membrane rigidity by using a positive pressure generated in the air flow between the air bearing surface and the disk is shown, but it goes without saying that similar effect can be obtained by realizing a configuration that may bring about similar membrane rigidity by using other lubricating agent.

Next, in order to verify the condition for a head slider having excellent impact resistance as described above, the difference in impact resistance due to the difference in air bearing surface shape of the head slider was specifically examined, and the results are shown in the following.

Figure 14:
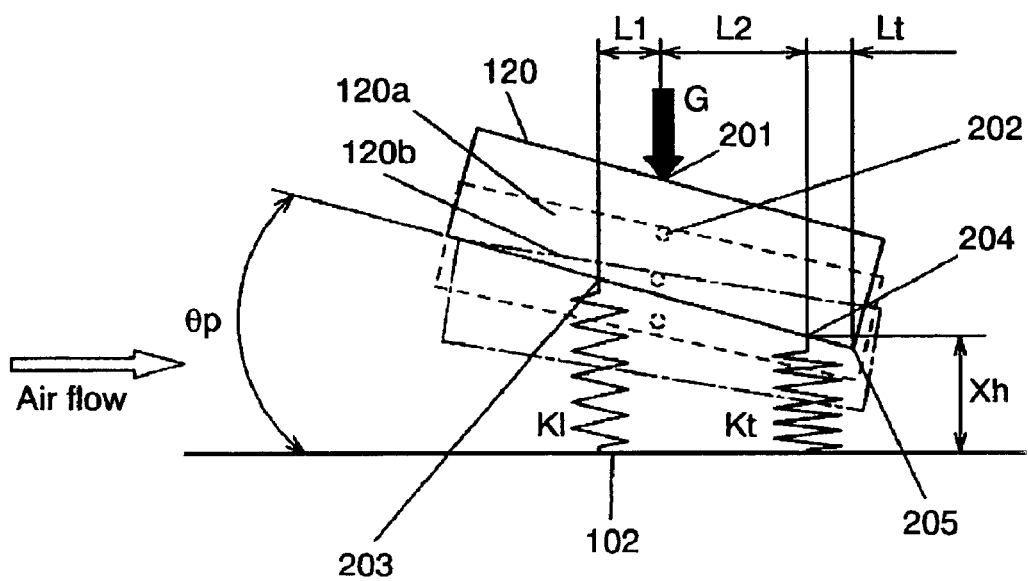
FIG. 14 is a schematic diagram showing the behavior in the flying state of the head slider when inertia force caused by external impact is applied to the head slider in the second preferred embodiment of the present invention.
Figure 15:
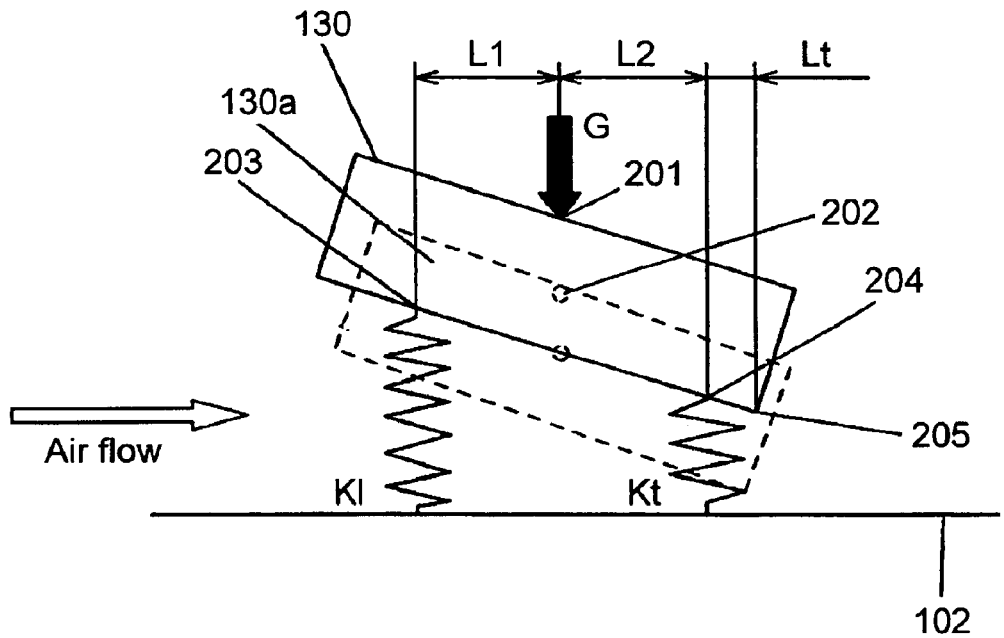
FIG. 15 is a schematic diagram showing the behavior in the flying state of the head slider when inertia force caused by external impact is applied to the head slider of the comparative example 3 as against the present invention.
Figure 16:
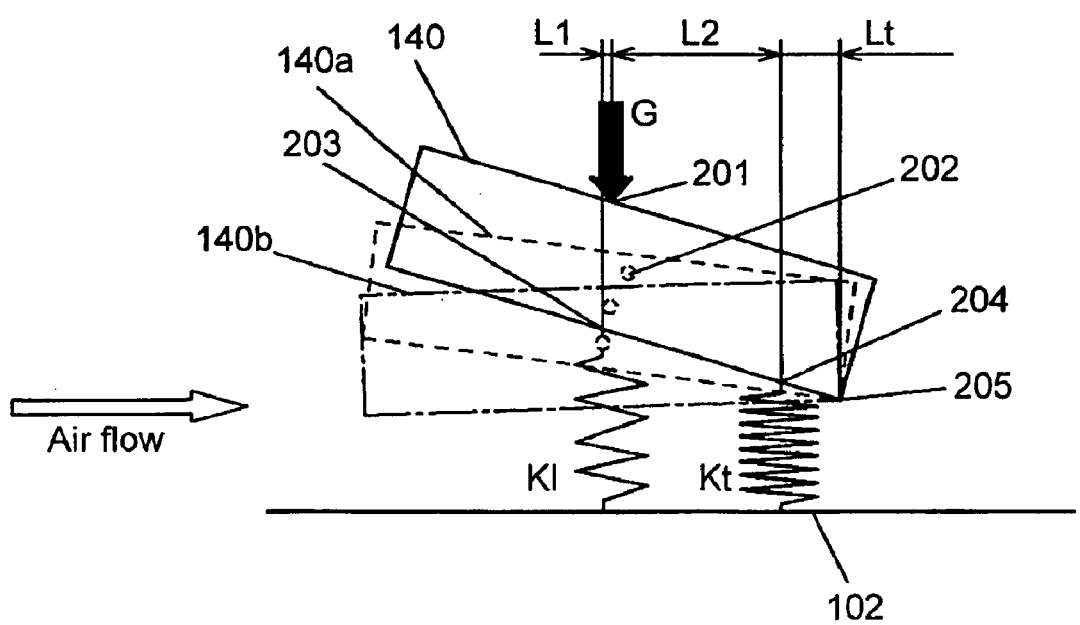
FIG. 16 is a schematic diagram showing the behavior in the flying state of the head slider when inertia force caused by external impact is applied to the head slider of the comparative example 4 as against the present invention.
Figures 17, 18:
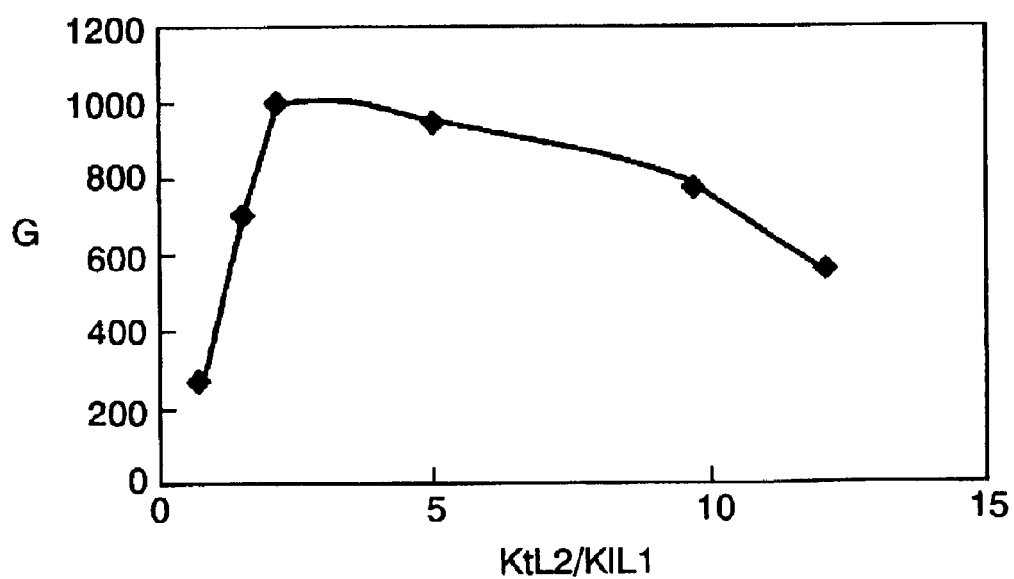
FIG. 17 is a characteristics table of comparison between the head slider in the second preferred embodiment of the present invention and the comparative example.
FIG. 18 is a chart showing the relationship between (KtL2/KlL1) value and impact resistance value in the second preferred embodiment of the present invention.

In FIG. 17 are shown the specification of the head slider subjected to the evaluation, and the evaluation result of impact resistance. Also, the behaviors of the head slider when inertia force is applied to each head slider are shown in FIG. 14, FIG. 15 and FIG. 16.

In the head slider of the present invention, when the air lubricating film rigidities obtained at the upstream rigidity action position 203 spaced apart by distance L1 in a direction parallel to the disk 102 in the direction of air inflow end from the inertia force action position and at the downstream rigidity action position 204 spaced apart by distance L2 in the direction of air inflow end from the inertia force action position when inertia force G caused by external impact or the like is applied, are respectively Kl and Kt, then the position of Kl=Kt, L1=0.23 (mm), L2=0.58 (mm). Further, the evaluation was executed under the condition: the distance Lt=0.1 (mm) between the downstream rigidity action position 204 and the air outflow end portion 205; the amount of flying Xh=20 (nm) at the downstream rigidity action position 204 in a stationary flying state at the inner periphery of the disk; and the pitch angle θp=30 (μrad).

On the other hand, for the purpose of comparison with the head slider of the present invention, the evaluation was also executed with respect to the head sliders based on the specifications of the comparative example 3 and comparative example 4 shown in FIG. 17.

In the air bearing surface of head slider 130 of comparative example 3, when the air lubricating film rigidities at the upstream rigidity action position 203 and the downstream rigidity action position 204 are respectively Kl and Kt, then the position of Kl=Kt, L1=0.32 (mm), L2=0.3 (mm).

Also, in head slider 140 of comparative example 4, when the air lubricating film rigidities at the upstream rigidity action position 203 and the downstream rigidity action position 204 are respectively Kl and Kt, then the position of Kl=Kt, L1=0.05 (mm), L2=0.61 (mm).

As for the head slider 120 in the preferred embodiment of the present invention, and the head sliders 130, 140 of the comparative example 3 and comparative example 4, the value of (KtL2/KlL1) was obtained, and at the same time, the impact resistance when inertia force is generated due to external impact such as causing the head slider to approach the disk was evaluated, and the results are shown in FIG. 17. Here, the impact resistance is represented by the level of inertia force necessary for making any part of the head slider subjected to the evaluation come into contact with the disk.

In the evaluation of such impact resistance, the conditions for evaluation are as follows: the equivalent mass including the head slider and slider supporting section is 8 (mg); the activating force given from the suspension to the head slider is 2 (gf); the disk rotating speed is 4,500 (rpm); and the skew angle is −5 (°) at the position of disk radius 6 (mm)

As shown in FIG. 17, the value of (KtL2/KlL1) of the head slider 120 in the present embodiment is 2.53, while the values of (KtL2/KlL1) of comparative examples 3 and 4 are respectively 0.97 and 12.2. Also, the impact resistance value of the head slider 120 in the preferred embodiment is 1000 G, while the impact resistance values of comparative examples 3 and 4 are respectively 260 G and 570 G.

Taking into account the use as a magnetic disk drive in use for mobiles, it is obvious that the head slider of the present invention may realize practical impact resistance.

Next, as for several head sliders including the head slider 120 of the present embodiment and the head sliders 130, 140 of comparative examples 3, 4, the relations of the air lubricating film rigidity ratio (KtL2/KlL1) at the upstream rigidity action position 203 and the downstream rigidity action position 204, and the evaluation results of impact resistance are graphed in FIG. 18.

As is apparent in FIG. 18, the variation of impact resistance is depending upon the value of (KtL2/KlL1).

Also, as described above, since the formula $$(KtL2/KlL1)=(XlL2/XtL1)$$

holds good, it can also be said that the variation of impact resistance is depending upon the value of (XlL2/XtL1).

As described above, in case the air lubricating film rigidity at the upstream rigidity action position 203 is different from the air lubricating film rigidity action position 204, the head slider subjected to the inertia force G caused by external impact is different in the amount of displacement in a direction vertical to the disk between the upstream rigidity action position 203 and the downstream rigidity action position 204, and therefore, it is displaced while rotating in the pitch direction.

That is, the behavior of the head slider when inertia force G caused by external impact is applied thereto varies with the value of (KtL2/KlL1).

When the condition for the present evaluation is inserted into the design condition of the head slider having excellent impact resistance in the present invention described above, that is, $$(((L1+L2)\tan\theta p)/Xh) \leq ((KtL2/KlL1)-1) < ((L1+L2)/Lt) \quad (14)$$

then obtained is $$1.5 \leq ((KtL2/KlL1)-1) < 10.0 \quad (31)$$

and when $$2.5 \leq (KtL2/KlL1) < 11.0 \quad (32)$$

is satisfied, it is possible to obtain a head slider having excellent impact resistance.

Next, regarding three types of head sliders in the present preferred embodiment, the behaviors when inertia force is applied thereto will be described with reference to the drawings.

The head slider 120 of the present invention satisfies the condition of formula (32). Accordingly, as shown in FIG. 14, when inertia force G caused by external impact is applied to the head slider 120, it is displaced to the position shown by head slider 120a, but the displacement amount of flying space is smaller at the outflow end side than at the inflow end side. When inertia force larger than inertia force G is further generated due to external impact, it is displaced to the position shown by head slider 120b. However, even in this condition, since the head slider maintains a positive pitch angle, the air lubricating film formed between the air bearing surface of head slider 120 and the surface of disk 102 will not be broken, and thereby, the air lubricating film acting as an air spring may prevent the surfaces from colliding with each other. Or, even in case of colliding, the colliding energy is very low and it will hardly cause damage to the head slider 120 or disk 102.

On the other hand, in the case of head slider 130 of the comparative example 3, as shown in FIG. 15, the value of (KtL2/KlL1) is 0.97 and does not satisfy the condition of formula (32). At the upstream rigidity action position 203, the amount of displacement in a direction vertical to the disk 102 after application of inertia force G caused by external impact is smaller as against the amount of flying in the initial position. Therefore, when inertia force G is generated due to external impact, the head slider is hardly rotated in the pitch direction and is displaced nearly vertically. As a result, a relatively low inertia force G due to external impact may cause the air outflow end portion 205 at the downstream side to come into collision with the disk 102.

Also, in the case of head slider 140 of the comparative example 4, as shown in FIG. 16, the value of (KtL2/KlL1) is 12.2 and does not satisfy the condition of formula (32). In such head slider 140, even when displaced to the position shown by head slider 140a due to inertia force G caused by external impact, it will not collide with the disk 102. However, when inertia force is further generated due to external impact, as shown by head slider 140b, the flying space at the air inflow end of the upstream side is smaller than the flying space at the air outflow end of the downstream side, then no air lubricating film is formed between the air bearing surface of head slider 140 and the surface of disk 102. Such a phenomenon results in abrupt losing of the flying power, causing the head slider 140 to collide with the surface of disk 102, and it will increase the possibility of damaging the head slider 140 or disk 102.

Through the above examination, it has been verified that the head slider of the present invention is excellent in impact resistance, satisfying the condition mentioned above.

In the head slider of the present invention, the air bearing surface shape is not limited by any means. Whatever the shape of the air bearing surface, it is possible to obtain a head slider having excellent impact resistance provided that the condition as shown in the formula (14) is satisfied.

(Third Preferred Embodiment)

As the third preferred embodiment of the present invention, a head supporting device and disk drive using a head slider of the present invention will be described with reference to the drawings.

Figure 19:
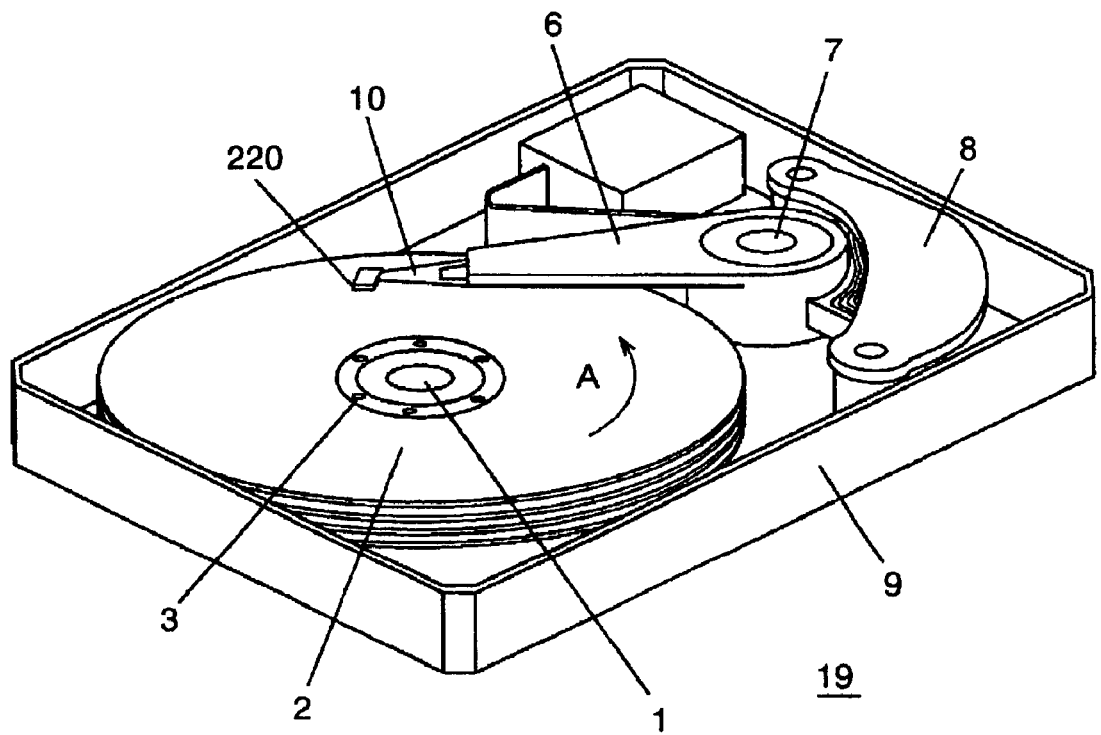
FIG. 19 is a perspective view of an essential portion of a disk drive configured by using a head slider and head supporting device in the third preferred embodiment of the present invention.

FIG. 19 is a perspective view of an essential portion of the disk drive of the present invention. As an example of disk drive, a magnetic disk drive is used for the description.

In FIG. 19, disk 2 is rotatably supported on spindle 1 and is driven by driving means 3. As the driving means 3, for example, a spindle motor is used. A head slider 220 of the present invention comprising information transducer (not shown) for recording and reproducing is fixed on suspension 5 and forms head supporting device 10. The head supporting device 10 is fixed on actuator arm 6, and further, the actuator 6 is rotatably disposed on actuator shaft 7.

The head slider 220 of the present invention is a head slider that satisfies the formula (1), formula (7), formula (14) or formula (20) mentioned in the first or second preferred embodiment of the present invention.

The definition of each constant and variable is omitted because of being same as in the first preferred embodiment and the second preferred embodiment.

As rotating means 8, for example, a voice coil motor is used. It rotates the actuator arm 6 to move the head slider 220 to a desired track position on the surface of disk 2. Casing 9 maintains these components in the specified positions.

Figure 20:
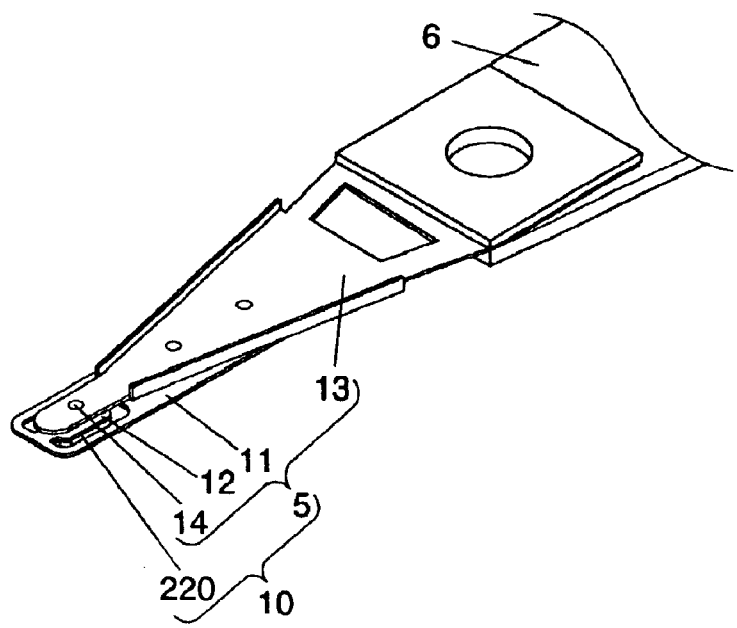
FIG. 20 is a perspective view of an essential portion showing a head slider and head supporting device in the third preferred embodiment of the present invention.

FIG. 20 is a perspective view of an essential portion of the head supporting device 10 formed of suspension 5 and head slider 220. The head slider 220 is fixed on tongue-shaped-section 12 disposed at one end of the tip portion of slider retainer 11. Also, the other end of the slider retainer 11 is secured on beam 13.

As the slider retainer 11, for example, a ginbal spring is employed, and it is configured so as to allow the head slider 220 to pitch and roll. The head slider 220 is fixed on the slider supporting retainer 11, for example, by using adhesive agent, while the slider retainer 11 may be fixed on the beam 13, for example, by welding. At the tip portion of beam 13 is provided pivot 14 for applying a load to the head slider 220, and a specified load is applied to the head slider 220 via the pivot 14. The point at which the pivot 14 touches the head slider 220 is the pivot position or the load action point, described in the first preferred embodiment and the second preferred embodiment, that is, the action point on which inertia force acts when inertia force is applied due to external impact or the like.

At the time, by forming the head supporting device 10 so that the center of gravity position and pivot position of the head slider 220 coincide with each other when projected against the recording medium surface, it is possible to make the head supporting device 10 most excellent in impact resistance.

Further, the suspension 5 comprises beam 13 having pivot 14, and slider retainer 11 having tongue-shaped-section 12, and also, the head supporting device 10 is formed including the head slider 220.

When recording and reproducing on the rotating disk 2 by using such head supporting device 10, there are three forces such as a load applied from the pivot 14 to the head slider 220, a positive force that acts to raise the head slider 220 from the disk 2 by air flow because the air bearing surface of head slider 220 is so designed, and a negative force that acts to move the head slider closer to the disk 2. With these forces balanced against each other, the head slider 220 stably rises and, keeping a constant amount of flying, it drives the rotating means 8 for finding the desired track position, and thereby, it is possible to perform recording and reproducing by transducer (not shown).

By using head supporting device 10 and disk drive 19, on which head slider 220 of the present invention having such configuration, it is possible to obtain a head supporting device and a disk drive having excellent impact resistance.

The present invention is not limited to the magnetic disk drive shown as an example, and it is, needless to say, applicable to a disk drive using a flying-type head slider such as an optical magnetic disk drive and optical disk drive.

Also, the present invention is not limited to a disk drive using a disk type medium, and it is, needless to say, applicable to a recording and reproducing apparatus using any other type of medium.

As described above, the head slider of the present invention may relieve the inertia force by rotating in the pitch direction while keeping the positive pitch angle when inertia force caused by external impact is applied to the head slider.

By this configuration, even when inertia force caused by great external impact is generated when the head slider is flying above the disk, it is possible to prevent the head slider from colliding with the disk surface or to prevent the disk from being damaged by lessening the colliding energy. Thus, it is possible to provide a highly reliable head slider, head supporting device, and disk drive.

What is claimed is:

1. A head slider characterized in that, when an inertia force is generated, at an upstream position spaced apart by distance L1 in the direction of air inflow end from a position where said inertia force is applied to said head slider, and at a downstream position spaced apart by distance L2 in the direction of air outflow end from a position where said inertia force is applied, the membrane rigidities of air spring layer formed between said head slider and a recording medium are Kl and Kt respectively; and the amount of flying in a vertical direction from said recording medium at said downstream position is Xh, and the angle formed by the surface to be opposed to said recording medium of said head slider against said recording medium in stable flying of said head slider is θp, then the relationship $$((L1+L2)\tan \theta p/Xh) \leq ((KtL2/KlL1)-1)$$

is satisfied.

2. The head slider of claim 1, wherein the relation of $$((KtL2/KlL1)-1) < ((L1+L2)/Lt)$$

is satisfied when the distance in a direction parallel to said recording medium between said downstream position and a downstream end portion of the surface to be opposed to said recording medium of said head slider is Lt.

3. The head slider of claim 1, wherein the membrane rigidities are realized, in place of the air spring layer, by a lubricating layer formed between said head slider and said recording medium surface.

4. A head slider, wherein said recording medium is a disk medium, and at the innermost periphery of said disk medium, the relationship in claim 1 is satisfied.

5. A head supporting device, comprising the head slider of claim 1, and a suspension configured so that a specified activating force is given to said head slider in the direction of said recording medium via a pivot, and a pivot position at which said pivot touches said head slider is the rotational center of said head slider.

6. The head supporting device of claim 5, wherein the center of gravity position of said head slider and said pivot position coincide with each other when projected on the surface of said recording medium.

7. A disk drive, comprising the head supporting device of claim 5, and said recording medium, a driving means for rotationally driving said recording medium, a rotating means for moving said head slider, and a control means.

8. A head slider characterized in that, when an inertia force is generated, at an upstream position spaced apart by distance L1 in the direction of air inflow end from a position where said inertia force is applied to said head slider, and at a downstream position spaced apart by distance L2 in the direction of air outflow end from a position where said inertia force is applied, the membrane rigidities of air spring layer formed between said head slider and a recording medium are Kl and Kt respectively, then the relation of $$2.5 \leq (KtL2/KlL1) < 11.0$$

is satisfied.

9. A head slider characterized in that, when an inertia force is generated, at an upstream position spaced apart by distance L1 in the direction of air inflow end from a position where said inertia force is applied to said head slider, and at a downstream position spaced apart by distance L2 in the direction of air outflow end from a position where said inertia force is applied, the amounts of displacement in a direction vertical to recording medium are Xl and Xt respectively; and the amount of flying in a vertical direction from said recording medium at said downstream position is Xh, and the angle formed by the surface to be opposed to said recording medium of said head slider against said recording medium in stable flying of said head slider is θp, then the relation of $$((L1+L2)\tan \theta p/Xh) \leq ((XlL2/XtL1)-1)$$

is satisfied.

10. The head slider of claim 9, wherein the relation of $$((XlL2/XtL1)-1) < ((L1+L2)/Lt)$$

is satisfied when the distance in a direction parallel to said recording medium between said downstream position and a downstream end portion of the surface to be opposed to said recording medium of said head slider is Lt.

11. A head slider characterized in that, when an inertia force is generated, at an upstream position spaced apart by distance L1 in the direction of air inflow end from a position where said inertia force is applied to said head slider, and at a downstream position spaced apart by distance L2 in the direction of air outflow end from a position where said inertia force is applied, the amounts of displacement in a direction vertical to recording medium are Xl and Xt respectively; then the relation of $$2.5 \leq (XlL2/XtL1) < 11.0$$

is satisfied.

* * * * *